United States Patent [19]
Fogh et al.

[11] Patent Number: 6,084,757
[45] Date of Patent: Jul. 4, 2000

[54] PROTECTIVE IMPEDANCE FOR A MAINS VOLTAGE SUPPLIED ELECTRONIC CIRCUIT

[75] Inventors: Hans Erik Fogh, Sønderborg; Axel Schønwandt, Augustenborg, both of Denmark

[73] Assignee: Danfoss A/S, Nordborg, Denmark

[21] Appl. No.: 09/178,014

[22] Filed: Oct. 23, 1998

[30] Foreign Application Priority Data

Oct. 25, 1997 [DE] Germany .............................. 19 47 255

[51] Int. Cl.[7] ....................................................... H02H 9/00
[52] U.S. Cl. .............................. 361/58; 361/18; 361/115
[58] Field of Search ................................ 361/58, 18, 115, 361/118, 113

[56] References Cited

U.S. PATENT DOCUMENTS 5,521,501   5/1996   Dettmann et al. ...................... 324/252

*Primary Examiner*—Stephen W. Jackson
*Attorney, Agent, or Firm*—Lee, Mann, Smith, McWilliams, Sweeney & Ohlson

[57] ABSTRACT

A protective impedance for a mains voltage supplied electronic circuit has ohmic resistors which are applied to a substrate as film. At least two resistors form a series connection. At least two series connections are connected in parallel. This permits relatively large operating currents with relatively short series connections.

8 Claims, 1 Drawing Sheet

PROTECTIVE IMPEDANCE FOR A MAINS VOLTAGE SUPPLIED ELECTRONIC CIRCUIT

BACKGROUND OF THE INVENTION

The invention concerns a protective impedance for a mains voltage supplied electronic circuit with ohmic resistors applied as film on a substrate, at least two resistors forming a series connection.

A protective impedance of this kind is known from the international standard EN 60730-1, edition 1993-10(IEC 730-1), Annex H: "Automatic electrical controls for household and similar use". One of these protective impedances lies between one of the mains connections and the electronic circuit. A second protective impedance lies between the other mains connection and the electronic circuit. Each of the protective impedances comprises at least two single impedances connected in series, preferably ohmic resistors applied as oxide film, metal film, carbon film etc. on a substrate. The resistors are dimensioned so that the short-circuiting of one of the protective impedances, for example by an operator, and the short-circuiting of a resistor of the second protective impedance, for instance by a creepage current, will permit the flow of an AC of maximum 0.7 mA (peak value) or a DC of maximum 2 mA.

To meet these conditions, the individual resistors have relatively high resistance values. This again means that the operating current of the electronic circuit, which must flow through both protective impedances, is substantially lower than the mentioned maximum values, which often causes problems when designing the electronic circuit. Certainly an increase of the series-connected resistors of a protective impedance will cause an increase of the permitted operating current. However, this requires a correspondingly long substrate, for which space is often not available.

SUMMARY OF THE INVENTION

It is the task of the invention to propose a protective impedance as described in the introduction, in which a substrate with the smallest possible length permits a highest possible operating current.

According to the invention this task is solved in that at least two series connections, each having at least two resistors, are connected in parallel.

Even though the parallel connection requires the individual resistors to have higher values, the parallel connection will result in a higher operating current than a simple series connection. In other words, a maximum permissible operating current resulting from one single series connection of several resistors can, with a parallel connection, be obtained with a small number of resistors in the series connection. Thus, the longitudinal dimensions of the substrate can be kept small and still the maximum permissible operating current can be increased.

Preferably, all individual resistors have approximately the same value, and their number is the same in all parallel branches. This causes the lowest load on each individual resistor and facilitates manufacturing.

It is particularly advantageous that for every three resistors two series connections are provided. The maximum permissible operating current corresponds to the current, which can be reached with one single series connection of five resistors. The length of the substrate is correspondingly small.

In a preferred embodiment it is provided that for the formation of a series connection a straight film strip is applied on the substrate, the film strip having in the middle of its length at least one electrically well conducting covering. This gives a particularly simple way of production, as the individual resistors must not be fitted as discrete parts.

It is particularly recommendable that for the formation of the parallel connection at least two film strips provided with coverings are applied on the substrate next to each other and have common connection electrodes at the ends. The additional parallel connection hardly require increased efforts in production. The parallel connections can be arranged close to each other, so that also the cross dimensions of the substrate are small.

In a preferred embodiment the distance between neighbouring film strips is 0.2 to 0.5 mm.

In addition it is recommended that the resistors are dimensioned so that the voltage drop during normal operation is <50 V (rms). This is obtained with a mains AC of 240 V (rms), when in each of the two protective impedances at least three resistors are connected in series. With such a low voltage drop very small creepage current distances of only 3 mm are sufficient.

Additionally, it is favourable for the series connections connected in parallel to be covered by an isolating layer. According to EN 60730 this isolating layer can be made with the purity degree "clean", that is, they may be made of for example epoxy. Thus, the creepage current distances can even be reduced to 2 mm.

BRIEF DESCRIPTION OF THE DRAWINGS

In the following the invention is described on the basis of preferred embodiments in connection with the drawings, showing.

DESCRIPTION OF THE PREFERRED EMBODIMENTS

Figure 1:
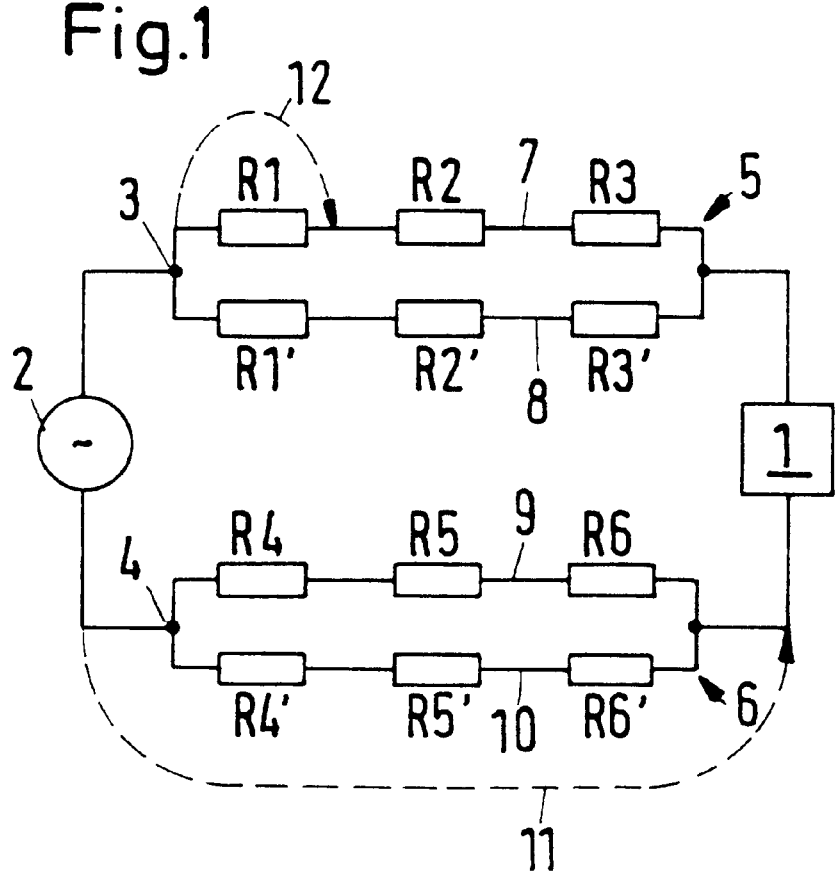
FIG. 1 a circuit diagram of a mains voltage supplied electronic circuit with protective impedances according to the invention FIG. 2 a top view of a protective impedance according to the invention

An electronic circuit 1, for example an electronic temperature controller for refrigeration appliances, is supplied with current from a mains 2, in this example an AC mains, but it could also be a DC mains. For this purpose two mains connections 3 and 4 are connected with the electronic circuit 1 via a protective impedance 5 or 6, respectively.

The protective impedance 5 has two parallel connections 7 and 8, each comprising three individual ohmic series resistors R1, R2 and R3 or R1', R2' and R3', respectively. In a similar way the protective impedance consists of two parallel connections 9 and 10, each with three individual ohmic series resistors R4, R5 and R6 or R4', R5'and R6', respectively.

According to the international standard EN 60730-1 this electronic circuit 1 is regarded as shock proof, when also under unfavourable circumstances the current flowing is never higher than 0.7 mA AC (peak value) or 2 mA DC. An unfavourable circumstance could be that an operator touches both a mains conductor and the electronic circuit 1 simultaneously, that is, short-circuits one of the protective impedances, for example the protective impedance 6 (see the dotted arrow 11) and that at the same time one of the resistors in the protective impedance is short-circuited (see the dotted arrow 12).

It is assumed that the mains has a voltage of 240 V, which corresponds to a peak value of 339 V. To provide that with this potential an AC current no higher than 0.7 mA flows, the remaining active resistors in the protective impedance 5 must have a total value of 485 kΩ. This can be converted to a value of 404 kΩ for each individual resistor.

During operation, when all resistors are active, the resistance of each protective impedance amounts to 606 kΩ and the total circuit resistance is 1212 kΩ, the impedance of the electronic circuit 1 being neglected. This gives a maximum possible operating current of 0.28 mA. To reach this value with one single respective series connection, at least five individual resistors must lie in series. The maximum permissible operating current can then be increased by increasing the number of resistors. For example, two parallel branches each with four resistors will permit an operating current of 0.3 mA, for which one single series connection would require seven resistors.

Figure 2:
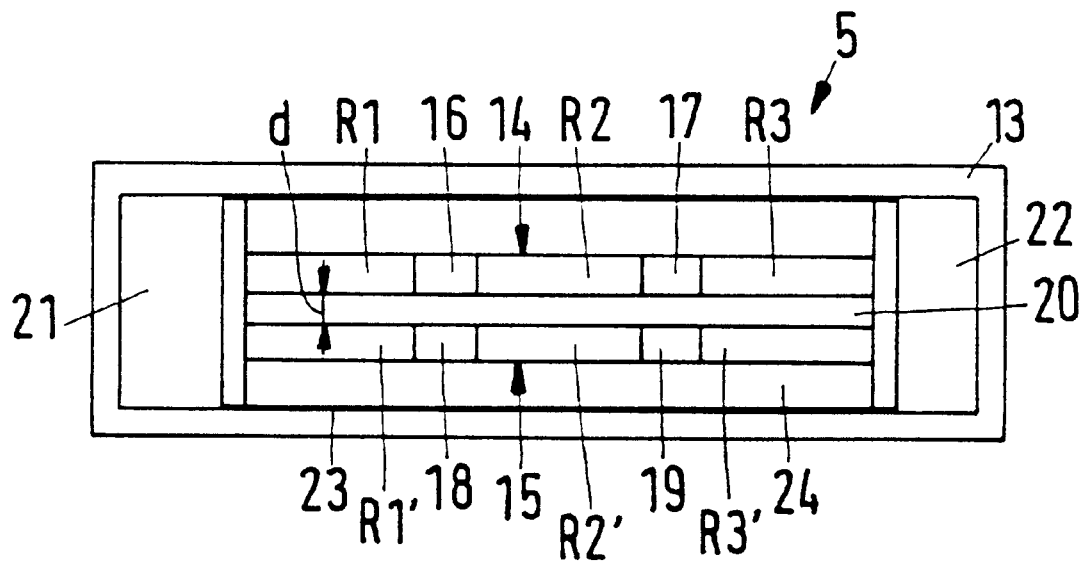

FIG. 2 shows, that such a protective impedance 5 is very space saving when arranged on a ceramics substrate 13. Two thick film strips 14 and 15 are arranged on the surface of this substrate. Each of these strips has in two places a covering 16 and 17 or 18 and 19, respectively, of an electrically well conducting material. Thus, three respective individual resistors R1, R2 and R3 or R1', R2' and R3', respectively, appear. A free track 20 having a width d of approximately 0.2 mm remains between the film strips. At the ends the two thick film strips 14 and 15 are covered by common connection electrodes 21 or 22, respectively. Finally, the whole arrangement, also the track 20 and the free spaces 24, is covered by an isolating layer 23, for example of glass or epoxy resin, however leaving a part of the connection electrodes 21 and 22 free. Utilising the described possibilities, protective impedances with very small dimensions can be produced. For example, the substrate 13 in FIG. 2 can have a length of only 11 mm and a width of 3 mm.

The same applies when the electronic circuit 1 is connected to a DC mains. It must only be observed that the current flowing in the most unfavourable case is <2 mA.

If desired, the electronic circuit 1 can also be earthed. This permits a further increase of the permissible operating current.

What is claimed is:

1. Protective impedance for a mains voltage supplied electronic circuit with ohmic resistors applied as film on a substrate, comprising at least two resistors forming a series connection, and including at least two of said series connections, each having at least two resistors, and said series connections being connected in parallel.

2. Protective impedance according to claim 1, in which all individual resistors have approximately the same value, and their number is the same in all parallel connections.

3. Protective impedance according to claim 1, including two series connections for every three resistors.

4. Protective impedance according to claim 1, in which a said series connection comprises a straight film strip applied on a substrate, the film strip having in the middle of its length at least one electrically well conducting covering.

5. Protective impedance according to claim 4, in which, for the formation of the parallel connection, at least two film strips with coverings are located on a substrate next to each other and have common connection electrodes at opposite ends.

6. Protective impedance according to claim 5, in which a distance between neighbouring film strips is from 0.2 to 0.5 mm.

7. Protective impedance according to claim 1, in which the resistors are formed so that the voltage drop during normal operation is <50 V (rms).

8. Protective impedance according to claim 1, in which the series connections connected in parallel are covered by an isolating layer.

* * * * *